(12) United States Patent
Chao et al.

(10) Patent No.: US 8,131,105 B2
(45) Date of Patent: Mar. 6, 2012

(54) IMAGE PROCESSING METHOD AND DEVICE FOR PERFORMING BLOCK EFFECT REDUCTION

(75) Inventors: Po-Wei Chao, Taipei Hsien (TW); Hsin-Ying Ou, Hsin-Chu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1139 days.

(21) Appl. No.: 11/944,430

(22) Filed: Nov. 22, 2007

(65) Prior Publication Data

US 2008/0123988 A1 May 29, 2008

(30) Foreign Application Priority Data

Nov. 28, 2006 (TW) ................................ 95144002 A

(51) Int. Cl.
G06K 9/40 (2006.01)

(52) U.S. Cl. ........ 382/268; 382/260; 382/261; 382/266; 382/232; 348/14.13

(58) Field of Classification Search .................. 382/268, 382/260–261, 266, 232; 348/14.13
See application file for complete search history.

(56) References Cited

U.S. PATENT DOCUMENTS

| | | | | |
|---|---|---|---|---|
| 5,590,054 A * | 12/1996 | McIntosh | | 702/172 |
| 5,662,113 A | 9/1997 | Liu | | |
| 5,715,335 A * | 2/1998 | De Haan et al. | | 382/265 |
| 5,796,875 A * | 8/1998 | Read | | 382/261 |
| 5,819,035 A * | 10/1998 | Devaney et al. | | 709/202 |
| 6,188,799 B1 * | 2/2001 | Tan et al. | | 382/260 |
| 6,285,801 B1 * | 9/2001 | Mancuso et al. | | 382/268 |
| 6,317,522 B1 * | 11/2001 | Rackett | | 382/268 |
| 6,496,605 B1 * | 12/2002 | Osa | | 382/268 |
| 6,529,638 B1 * | 3/2003 | Westerman | | 382/275 |
| 7,277,592 B1 * | 10/2007 | Lin | | 382/268 |
| 7,460,596 B2 * | 12/2008 | Kwon et al. | | 375/240.03 |
| 7,551,793 B2 * | 6/2009 | Guangxi et al. | | 382/261 |
| 2002/0191858 A1 * | 12/2002 | Sindhu | | 382/261 |
| 2003/0044080 A1 * | 3/2003 | Frishman et al. | | 382/268 |
| 2003/0053708 A1 * | 3/2003 | Kryukov et al. | | 382/261 |
| 2004/0076237 A1 * | 4/2004 | Kadono et al. | | 375/240.29 |
| 2004/0081368 A1 | 4/2004 | Mathew | | |
| 2005/0175089 A1 * | 8/2005 | Jung | | 375/240.03 |
| 2005/0196063 A1 * | 9/2005 | Guangxi et al. | | 382/261 |
| 2005/0244063 A1 * | 11/2005 | Kwon et al. | | 382/233 |
| 2005/0276505 A1 * | 12/2005 | Raveendran | | 382/268 |
| 2006/0018557 A1 * | 1/2006 | Kwon et al. | | 382/232 |
| 2008/0085059 A1 * | 4/2008 | Chao et al. | | 382/260 |
| 2009/0148062 A1 * | 6/2009 | Gabso et al. | | 382/266 |

FOREIGN PATENT DOCUMENTS

| | | | |
|---|---|---|---|
| CN | 1668106 A | | 9/2005 |
| CN | 1694537 A | * | 11/2005 |
| EP | 1 469 680 A2 | | 10/2004 |
| EP | 1469680 A2 | * | 10/2004 |
| JP | 11298898 | * | 4/1998 |
| JP | 11298898 | | 10/1999 |
| TW | I237995 | | 8/2005 |

* cited by examiner

Primary Examiner — Jayesh A Patel

(74) Attorney, Agent, or Firm — Thomas, Kayden, Horstemeyer & Risley, LLP

(57) ABSTRACT

The present invention provides an image processing method for processing an image. The method includes: detecting at least an edge in the image; selecting at least a first pixel and at least a second pixel according to the edge; deciding whether the edge is a block effect by determining whether a pixel difference between the first pixel and the second pixel locates in a predetermined range; and filtering out the detected block effect.

2 Claims, 3 Drawing Sheets

IMAGE PROCESSING METHOD AND DEVICE FOR PERFORMING BLOCK EFFECT REDUCTION

BACKGROUND OF THE INVENTION

1. Field of the Invention

The present invention relates to an image processing method and device, and more particularly, to an image processing method and device for determining whether an edge in an image is a block effect and filtering out the block effect.

2. Description of the Prior Art

In the technical field of image processing, MPEG (Moving Picture Experts Group) and/or JPEG (Joint Photographic Experts Group) compression is commonly utilized in applications that encode, decode, transmit, store, or play images. Typically, DCT (Discrete Cosine Transform) is performed on the images during compression, thereby causing some problems. For example, suppose an image is compressed utilizing unsatisfactory quantization coefficients. Thus, after the image is decoded, there may exist some discontinuity (generally called "block effect") on block boundaries in the decode image due to that each DCT block (e.g. 8×8 block) in the image is separately encoded during compression without consideration for similarity between any adjacent blocks.

Conventionally, block effects in the image can be removed by the aid of related compression/decompression information generated during MPEG/JPEG compression. However, due to variety of image media presently used in the market, it is often hard to know the origin of the image, and it is also hard for a back end device processing the image to get the related compression/decompression information. Thus, how to effectively remove block effects from the image under such condition is still a considerable and unsolved issue.

SUMMARY OF THE INVENTION

It is therefore one of the objectives of the present invention to provide an image processing method and device for determining whether an edge in an image is a block effect and filtering out the block effect to solve the above mentioned problems.

The present invention discloses an image processing method for processing an image, comprising: detecting at least an edge in the image; selecting at least a first pixel at one side of the edge and at least a second pixel at the other side of the edge; deciding whether the edge is a block effect by determining whether a pixel difference between the first pixel and the second pixel located in a predetermined range; and filtering out the detected block effect.

The present invention also discloses an image processing device for processing an image, comprising: an edge detector, for detecting at least an edge in the image; a block effect detector, coupled to the edge detector, for selecting at least a first pixel at one side of the edge and at least a second pixel at the other side of the edge and deciding whether the edge is a block effect by determining whether a pixel difference between the first pixel and the second pixel locates in a predetermined range; and a block effect filter, coupled to the edge detector and the block effect detector, for filtering out the detected block effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
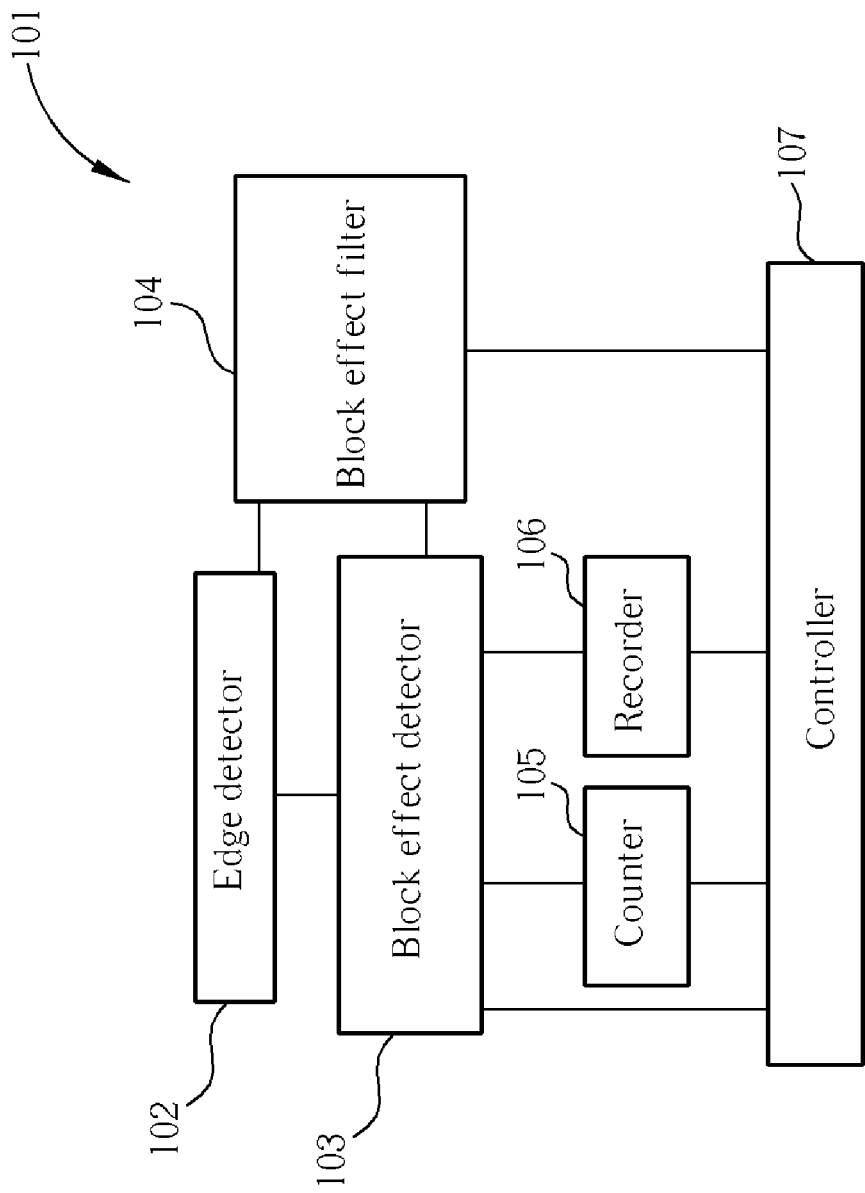
FIG. 1 is a schematic block diagram illustrating an embodiment of an image processing device of the present invention.

Please refer to FIG. 1. FIG. 1 is a schematic block diagram illustrating an embodiment of an image processing device 101 of the present invention. The image processing device 101 is utilized for processing a plurality of images. In this embodiment, the images are digital images having a plurality of pixels, and the pixels can be R, G, or B pixels of the RGB format, brightness or chrominance pixels of the YUV format, or pixels of other video formats. As shown, the image processing device 101 comprises an edge detector 102, a block effect detector 103, a block effect filter 104, a counter 105, a recorder 106, and a controller 107. The block effect detector 103 is coupled to the edge detector 102. The block effect filter 104 is coupled to the edge detector 102 and the block effect detector 103. The counter 105 is coupled to the block effect detector 103. The recorder 106 is coupled to the block effect detector 103. The controller 107 is coupled to the block effect detector 103, the block effect filter 104, the counter 105, and the recorder 106.

Figure 2:
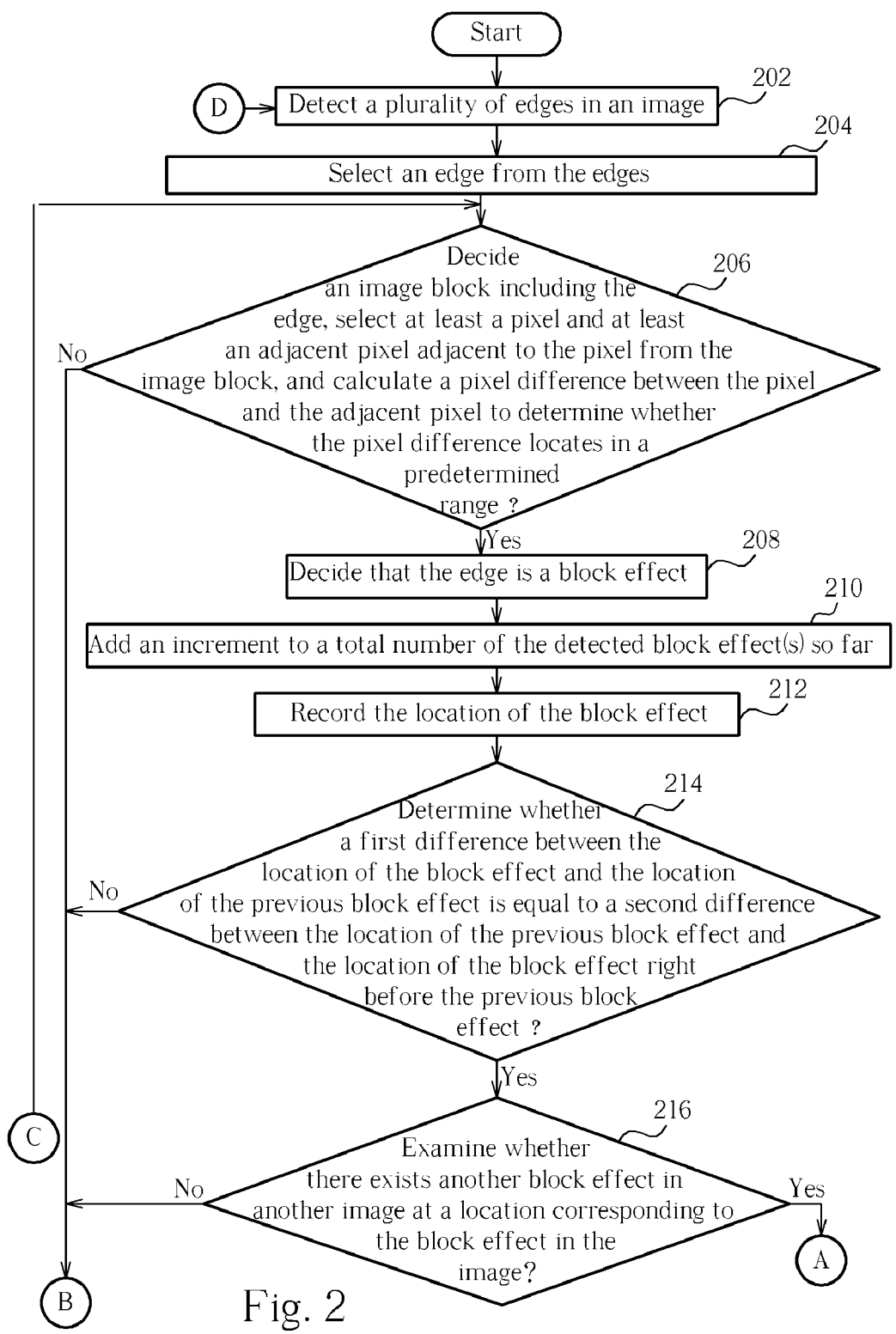
FIG. 2 is a flowchart illustrating an embodiment of an image processing method of the present invention.
Figure 3:
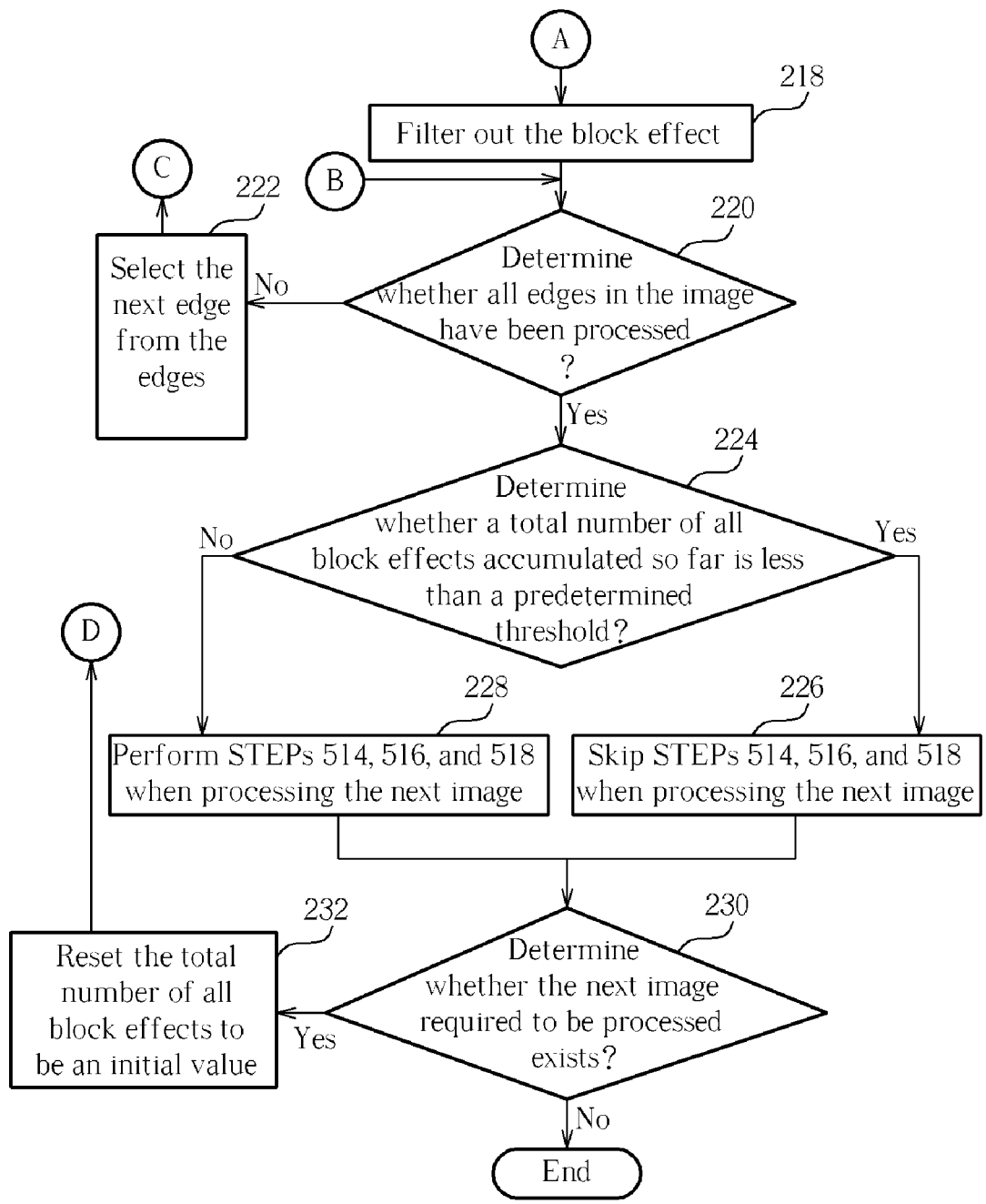
FIG. 3 is a continued flowchart corresponding to FIG. 2.

Please refer to both FIG. 2 and FIG. 3. FIG. 2 is a flowchart illustrating an embodiment of an image processing method of the present invention. FIG. 3 is a continued flowchart corresponding to FIG. 2. As shown, the image processing method performed by the image processing device 101 of FIG. 1 comprises the following steps:

STEP 202: Detect a plurality of edges in an image;

STEP 204: Select an edge from the edges to be processed;

STEP 206: Decide an image block including the edge, select at least a pixel and at least an adjacent pixel adjacent to the pixel from the image block, and calculate a pixel difference between the pixel and the adjacent pixel to determine whether the pixel difference locates in a predetermined range? If so, proceed to STEP 208; if not, jump to STEP 220;

STEP 208: Decide that the edge is a block effect;

STEP 210: Add an increment (e.g. 1) to a total number of the detected block effect(s) so far;

STEP 212: Record the location of the block effect;

STEP 214: Determine whether a first difference between the location of the block effect and the location of the previous block effect is equal to a second difference between the location of the previous block effect and the location of the block effect right before the previous block effect? If so, proceed to STEP 216; if not, jump to STEP 220 (i.e. skip STEP 216 and STEP 218);

STEP 216: Examine whether there exists another block effect in another image at a location corresponding to the block effect in the image? If so, proceed to STEP 218; if not, jump to STEP 220 (i.e. skip STEP 218);

STEP 218: Filter out the block effect;

STEP 220: Determine whether all edges in the image have been processed? If so, proceed to STEP 224; if not, proceed to STEP 222;

STEP 222: Select the next edge from the edges, and then return to STEP 206 for processing the next edge;

STEP 224: Determine whether a total number of all block effects accumulated so far is less than a predetermined threshold? If so, proceed to STEP 226; if not, proceed to STEP 228;

STEP 226: Skip STEPs 214, 216, and 218 when processing the next image;

STEP 228: Perform STEPs 214, 216, and 218 when processing the next image;

STEP 230: Determine whether the next image required to be processed exists? If so, proceed to STEP 232; if not, end the process herein; and STEP 232: Reset the total number of all block effects to be an initial value (e.g. 0), and then return to STEP 202 for processing the next image.

The details as to how the image processing device 101 performs the image processing method in FIGS. 2 and 3 is described below. First, the edge detector 102 detects a plurality of edges in an image (STEP 202). Sobel filters and Laplace filters are two common filters for detecting the edges. Since Sobel filters and Laplace filters are well known to those skilled in the art, the related description is omitted herein for simplicity. Next, the block effect detector 103 selects an edge from the edges to be processed (STEP 204). Then, the block effect detector 103 decides an image block from the edge, selects at least a pixel and at least an adjacent pixel adjacent to the pixel from the image block, wherein the pixel is located at one side of the edge, and the adjacent pixel is located at the other side of the edge (or located on the edge); calculates a pixel difference between the pixel and the adjacent pixel; and estimates whether the pixel difference locates in a predetermined range (STEP 206). Additionally, there are typically two kinds of edges in an image. One is the real edge of a real object, i.e. the object edge in the image. The other is the edge caused by block effects. After the edge detector 102 detects an edge, the block effect detector 103 can calculate a pixel difference between two adjacent pixels respectively on the two sides of the edge to determine which kind of edge the edge is. Typically, if the pixel difference is greater than a first threshold, the edge is determined to be the real edge of a real object. If the pixel difference is less than the first threshold and greater than a second threshold (i.e. locates in the predetermined range), the edge is determined to be a block effect. Additionally, the first threshold is greater than the second threshold; and the first threshold and the second threshold are greater than zero. Please note that, those skilled in the art can appropriately design the first threshold, the second threshold, and the corresponding predetermined range according to the practical requirements (or experimental results) after understanding the principles of the present invention as disclosed above.

If the pixel difference locates in the predetermined range, the block effect detector 103 will decide that the edge is a block effect (STEP 208). Then, the counter 105 will add 1 to a total number of the detected block effect(s) so far (STEP 210), and the recorder 106 will record the location of the block effect (STEP 212). The controller 107 will determines whether a first difference between the location of the block effect and the location of the previous block effect is equal to a second difference between the location of the previous block effect and the location of the block effect right before the previous block effect (STEP 214). Please note that, in other embodiments, the controller 107 can also achieve the same purpose in STEP 214 by determining whether the interval between the locations of any two adjacent block effects of a plurality of block effects occurring sequentially remains a fixed value (e.g. 8), i.e. whether the locations of the block effects occurring have some regularity. Next, if the first difference and the second difference are equal, the block effect detector 103 will examine or detect whether there exists another block effect in another image at a location corresponding to the block effect in the image (STEP 216). In this embodiment, the another image is a previous image right before the image on a temporal basis. Additionally, if the another block effect exists in the another image, the block effect filter 104 will perform low pass filtering on the edge to filter out the block effect (STEP 218). The median filtering method is a common low pass filtering method. Contrarily, if the another block effect does not exist in the another image, the controller 107 will disable the block effect filter 104 temporarily, and thus the process will skip STEP 218 and jump to STEP 220 directly. Additionally, if the first difference and the second difference are unequal, the controller 107 will also disable the block effect filter 104 temporarily, and thus the process will skip STEPs 216, 218 and jump to STEP 220 directly.

Please note that, the image processing device 101 of the present invention can process two images simultaneously. The image processing device 101 can also store the another image as mentioned in STEP 216 in an image buffer for further reference. Which way is more appropriate should be determined by the processing capability and bandwidth of the image processing device 101 in practical application. Additionally, the principle behind STEP 216 is to check whether two block effects occurring respectively in two different images on a temporal basis coincidentally locate at the same location on a spatial basis. Therefore, the another image can be a previous image right before the image, an image right before the previous image, or any other image before the image on a temporal basis. In other embodiments, the another image can also be a following image right after the image, an image right after the following image, or any other image after the image on a temporal basis. Furthermore, the controller 107 can also examine three (or more) different images on a temporal basis to determine whether the corresponding block effects coincidentally locate at the same location on a spatial basis.

Contrarily, if the pixel difference does not locate in the predetermined range, the process will jump to STEP 220, and thus the block effect detector 103 will determine whether all edges in the image have been processed (STEP 220).

If the image processing device 101 has not processed all edges in the image, the block effect detector 103 will select the next edge not yet processed from the edges (STEP 222). Afterwards, the process returns to STEP 206 for processing the next edge.

Contrarily, if all edges in the image have been processed, the controller 107 will determine whether a total number of all block effects accumulated so far is less than a predetermined threshold (STEP 224). If the total number of the block effects so far is less than the predetermined threshold (meaning that the detected block effects are not real block effects), the controller 107 will disable the block effect filter 104 temporarily. In such a case, when the image processing device 101 processes the next image, STEPs 214, 216, and 218 will all be skipped (STEP 226), thereby avoiding image quality deterioration due to unnecessary block effect filtering processes. Please note that, those skilled in the art can appropriately design the predetermined threshold according to the practical requirements (or experimental results) after understanding the principles of the present invention as disclosed above. Contrarily, if the total number of the block effects so far is not less than the predetermined threshold, the controller 107 will enable the block effect filter 104. Thus, when the image processing device 101 processes the next image, STEPs 214, 216, and 218 will be performed (STEP 228).

In this embodiment, for each image, the controller 107 does not determine whether the total number of all block effects accumulated so far is less than the predetermined threshold unless all edges in the image have been processed. This is not meant to be a limitation of the present invention, however. Furthermore, the controller 107 can also determine whether the total number of all block effects accumulated so far is less than the predetermined threshold at any other time point during the whole process. For each image, the controller 107 can determine whether the total number of all block effects accumulated so far is less than the predetermined threshold after at least 10 edges have been processed, for example.

Finally, the image processing device 101 determine whether the next image required to be processed exists (STEP 230). If no other images are required to be processed, the process will end herein. Contrarily, if there are still some images required to be processed, the counter 105 will reset the total number of all block effects to be 0 (STEP 232), and then the process will return to STEP 202 for processing the next image.

The image processing method and device of the present invention can be utilized for filtering out block effects, thereby upgrading image clarity. Additionally, the method and device needs neither compression/decompression information generated during MPEG (Moving Picture Experts Group) or JPEG (Joint Photographic Experts Group) compression nor original images before compression. In other words, the present invention can be applied to any image for detecting and filtering out block effects whether the image is compressed or not, whether the image is enlarged (e.g. from 8×8 blocks to 16×16 blocks) or not, whether the image is shrunk (e.g. from 16×16 blocks to 8×8 blocks) or not, and whether the image is shifted or not.

Please note that, the techniques and principles of the present invention as disclosed in the above embodiment(s) can be applied to various image processing devices including still picture processing devices, such as digital cameras, and motion video systems, such as LCDs (Liquid Crystal Displays), LCD TVs, and digital TVs. Those skilled in the art can easily apply the present invention to other related technical fields after understanding the techniques and principles of the present invention as disclosed in the above embodiment(s).

Additionally, those skilled in electronic circuit design, digital signal processing, or digital image processing, can also utilize any feasible principles as to hardware circuit design or software programming to accomplish the image processing method and device of the present invention after understanding the techniques and principles of the present invention as disclosed in the above embodiment(s).

Those skilled in the art will readily observe that numerous modifications and alterations of the device and method may be made while retaining the teachings of the invention.

What is claimed is:

1. An image processing method for processing block effect in an image, comprising:
   detecting at least an edge in the image;
   selecting at least a first pixel at one side of the edge and at least a second pixel at the other side of the edge;
   calculating a pixel difference between the first pixel and the second pixel;
   estimating whether the pixel difference is located in a predetermined range to determine whether the edge is a block effect; and
   when the edge is the block effect, filtering the block effect;
   wherein the step of detecting at least an edge in the image comprises detecting a plurality of edges in the image, and the image processing method further comprises:
   recording locations of a plurality of block effects; and
   controlling the step of filtering the block effect according to the locations of the block effects;
   wherein the step of controlling the step of filtering the block effect according to the locations of the block effects comprises:
   determining whether a first difference between the location of a current block effect and the location of a previous block effect is equal to a second difference between the location of the previous block effect and the location of a block effect right before the previous block effect; and
   disabling the step of filtering the block effect when the first difference and the second difference are unequal.

2. An Image processing device for processing an image, comprising:
   an edge detector, for detecting at least an edge in the image;
   a block effect detector, coupled to the edge detector, for selecting at least a first pixel at the one side of the edge and at least a second pixel at the other side of the edge and deciding whether the edge is a block effect by determining whether a pixel difference between the first pixel and the second pixel located in a predetermined range; and
   a block effect filter, coupled to the edge detector and the block effect detector, for filtering the block effect;
   wherein the edge detector, the block effect detector, and the block effect filter are implemented with hardware circuits;
   wherein the edge detector detects a plurality of edges in the image, the block effect detector determines whether there exists a block effect in the edges, and the image processing device further comprises:
   a recorder, coupled to the block effect detector, for recording locations of a plurality of block effects; and
   a controller, coupled to the recorder and the block effect filter, for controlling the block effect filter according to the locations of the block effects;
   wherein the controller determines whether a first difference between the location of a current block effect and the location of a previous block effect is equal to a second difference between the location of the previous block effect and the location of a block effect right before the previous block effect, and the controller disables the block effect filter temporarily when the first difference and the second difference are unequal.

* * * * *